United States Patent
Quintero et al.

(10) Patent No.: US 6,204,224 B1
(45) Date of Patent: Mar. 20, 2001

(54) POLYALKYL METHACRYLATE COPOLYMERS FOR RHEOLOGICAL MODIFICATION AND FILTRATION CONTROL FOR ESTER AND SYNTHETIC BASED DRILLING FLUIDS

(75) Inventors: Lirio Quintero; Shannon Stocks-Fischer; William R. Bradford, Jr.; Dennis K. Clapper, all of Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/416,685

(22) Filed: Oct. 12, 1999

Related U.S. Application Data

(60) Provisional application No. 60/104,092, filed on Oct. 13, 1998.

(51) Int. Cl.$^7$ .................................................. C09K 7/06
(52) U.S. Cl. .................... 507/123; 507/119; 507/224; 507/229
(58) Field of Search .................... 507/119, 123, 507/224, 229

(56) References Cited

U.S. PATENT DOCUMENTS

| | | | |
|---|---|---|---|
| 3,025,234 | * 3/1962 | Canterino | 507/123 |
| 3,350,366 | * 10/1967 | Merijan | 507/123 |
| 3,506,574 | 4/1970 | Stambaugh et al. | 252/51.5 |
| 3,928,255 | 12/1975 | Milkovich et al. | 260/2.5 R |
| 4,079,011 | 3/1978 | Tate | 252/8.55 C |
| 4,514,310 | 4/1985 | Heilweil | 252/8.55 R |
| 4,540,498 | 9/1985 | Wu et al. | 252/8.55 D |
| 4,552,670 | * 11/1985 | Lipowski et al. | 507/119 |
| 4,740,319 | * 4/1988 | Patel et al. | 507/123 |
| 4,792,412 | 12/1988 | Heilweil | 252/8.514 |
| 4,947,934 | * 8/1990 | Hen | 507/119 |
| 5,032,295 | 7/1991 | Matz et al. | 252/8.51 |
| 5,032,296 | * 7/1991 | Patel | 507/123 |
| 5,035,812 | 7/1991 | Aignesberger et al. | 252/8.51 |
| 5,283,235 | 2/1994 | Bush et al. | 507/118 |
| 5,407,909 | 4/1995 | Goodhue, Jr. et al. | 507/118 |
| 6,124,245 | * 9/2000 | Patel | 507/123 |

OTHER PUBLICATIONS

"Acryloid® 950 Series Multifunctional VI Improvers," Rohm and Haas Product Bulletin, 1994.
"Acryloid® 954," Rohm and Haas Product Bulletin, undated.
"Viscoplex® 6–954", Rohmax Product Bulletin, undated.
"Viscoplex and Viscobase Product Line Overview", Rohmax Product Bulletin, undated.

* cited by examiner

Primary Examiner—Philip Tucker
(74) Attorney, Agent, or Firm—Madan, Mossman & Sriram, P.C.

(57) ABSTRACT

A drilling fluid system for use in oil and gas well drilling operations is described having a rheological modifier/control agent comprising a polyalkyl methacrylate copolymer containing a small amount of vinyl pyrrolidone, a weighting agent, optionally an organophilic clay, with a base fluid making up the balance. The drilling fluid may be oil, invert emulsion, and in particular synthetic base fluid where the continuous phase may be synthetic esters olefins, paraffins, mineral oil or diesel oil, and the like. These copolymers prevent or reduce barite sag and provide cutting transport in these drilling systems.

21 Claims, 2 Drawing Sheets

POLYALKYL METHACRYLATE COPOLYMERS FOR RHEOLOGICAL MODIFICATION AND FILTRATION CONTROL FOR ESTER AND SYNTHETIC BASED DRILLING FLUIDS

This application claims the benefit of U.S. Provisional Application No. 60/104,092 filed Oct. 13, 1998.

FIELD OF THE INVENTION

The present invention relates to drilling fluids used during petroleum recovery operations, and more particularly relates, in one embodiment, to using the use of additives to modify the rheological and filtration control properties of the drilling fluids.

BACKGROUND OF THE INVENTION

Drilling fluids used in the drilling of subterranean oil and gas wells as well as other drilling fluid applications and drilling procedures are known. In rotary drilling there are a variety of functions and characteristics that are expected of drilling fluids, also known as drilling muds, or simply "muds". The drilling fluid is expected to carry cuttings up from beneath the bit, transport them up the annulus, and allow their separation at the surface while at the same time the rotary bit is cooled and cleaned. A drilling mud is also intended to reduce friction between the drill string and the sides of the hole while maintaining the stability of uncased sections of the borehole. The drilling fluid is formulated to prevent unwanted influxes of formation fluids from permeable rocks penetrated, and also often to form a thin, low permeability filter cake which temporarily seals pores, other openings and formations penetrated by the bit. The drilling fluid may also be used to collect and interpret information available from drill cuttings, cores and electrical logs. It will be appreciated that within the scope of the claimed invention herein, the term "drilling fluid" also encompasses "drill-in fluids" and "spotting fluids".

Spotting fluids are typically used to free stuck pipe during a drilling operation. Differential pressure sticking is the most common cause of stuck pipe in drilling operations, and circumstances which lead to differential sticking include overbalanced formation pressure and drill pipe that is stationary for a long amount of time. As drilling fluid is lost into the formation, the small pores of the formation face serve as filters, trapping the solids present in the mud system and causing a "filter cake" build up around the stationary pipe. Spotting fluids crack this filter cake and wet the space between the formation and the pipe, allowing the stuck pipe to be freed. Diesel and mineral oil-based fluids are conventionally used as spotting fluids, and are employed as a "slug" or "pill" within an aqueous drilling fluid.

Drilling fluids and such fluid systems are typically classified according to their base material. In water-based muds, solid particles are suspended in water or brine. Oil can be emulsified in the water, typically with the use of an emulsifier. Nonetheless, the water is the continuous phase. Brine-based drilling fluids, of course are a water-based mud in which the aqueous component is brine. Oil-based muds are the opposite. Solid particles are suspended in oil and water or brine is emulsified in the oil and therefore the oil is the continuous phase. Oil-based muds which are water-in-oil emulsions are also called invert emulsions. Such invert emulsions typically use an emulsifier, and brine is used as the discontinuous aqueous phase, obtained from a convenient source. Synthetic-based fluid systems are being developed to solve special challenges in hydrocarbon recovery. Such synthetic-based fluids include, but are not necessarily limited to, ester base fluids, such as ester oils (also sometimes called esterified oils) and isomerized-olefin based systems such as ISO-TEQ® from Baker Hughes INTEQ.

Polymers have been used in the past as viscosifiers in drilling fluid systems to carry or suspend cuttings, weighting agents and other solids in the fluids, such as invert emulsions. The use of new fluid systems, such as the synthetic systems, renders some conventional additives and agents ineffective or problematic.

It is apparent to those selecting or using a drilling fluid for oil and/or gas exploration that an essential component of a selected fluid is that it be formulated to achieve all of the necessary characteristics for the specific end application. Because the drilling fluids are called upon to do a number of tasks simultaneously, this desirable balance is not always easy to achieve.

It would be desirable if compositions and methods could be devised to aid and improve the ability of drilling fluids to simultaneously accomplish these tasks, particularly for the new synthetic drilling fluid systems.

SUMMARY OF THE INVENTION

Accordingly, it is an object of the present invention to provide methods to give good rheological properties and suspension characteristics to drilling fluid systems, particularly ester and other synthetic-based fluids.

It is another object of the present invention to provide stable drilling fluids exhibiting little or no barite sag.

It is another object of the present invention to provide an additive to give good fluid loss control properties to drilling fluid systems.

Still another object of the invention is to provide a composition and method which give synthetic drilling fluids having the necessary gel strength for carrying solids.

In carrying out these and other objects of the invention, there is provided, in one form, an oil-based fluid system for use in oil and gas well drilling operations including a polyalkyl methacrylate with vinyl pyrrolidone copolymer; a weighting agent; and a base fluid which may be oil, invert emulsion base fluids containing an emulsifier and brine, esters, olefins, or paraffins.

DETAILED DESCRIPTION OF THE INVENTION

Figure 1:
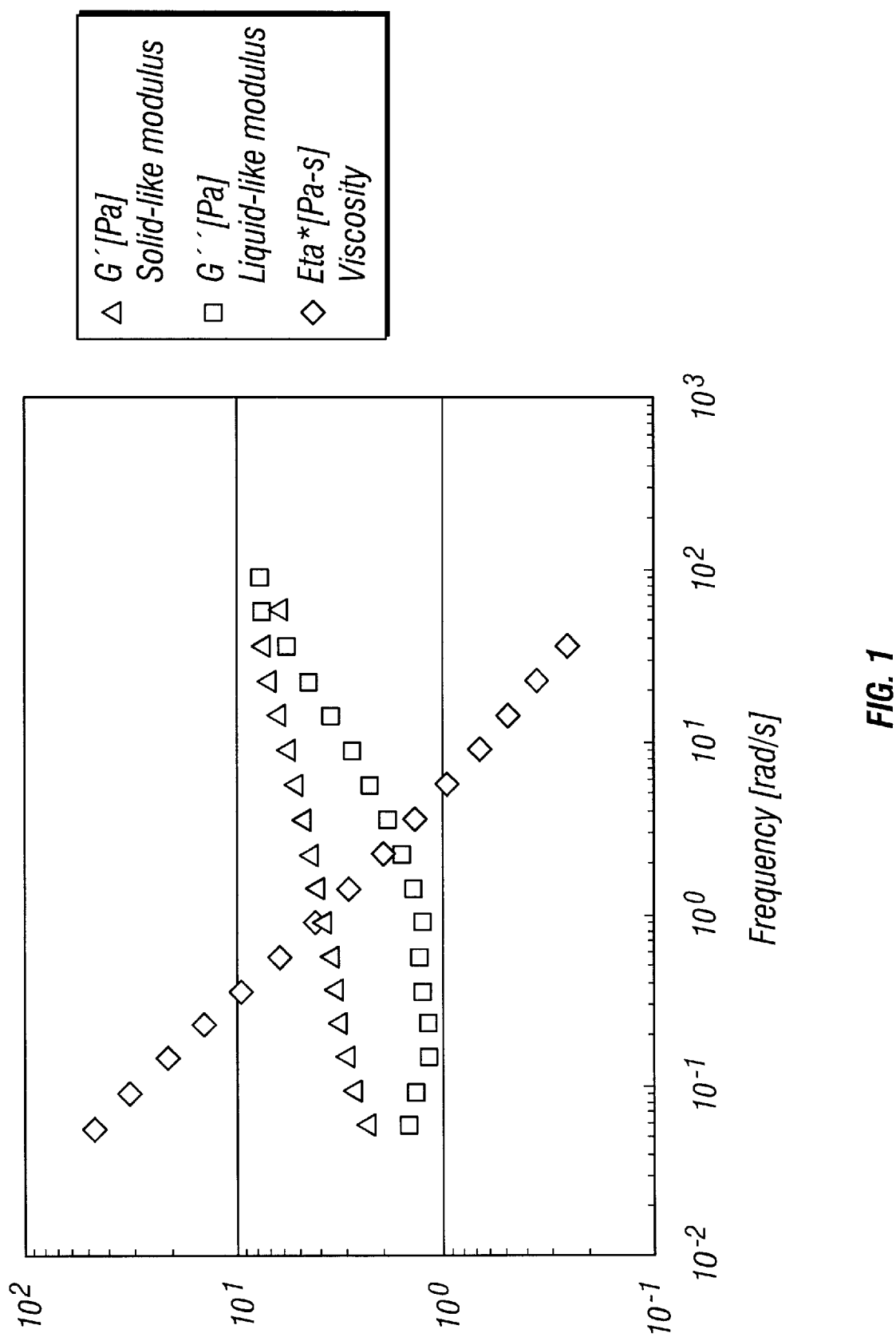
FIG. 1 graphs the dynamic frequency sweep of a composition of the invention including ester, organophilic clay, and polyalkyl methacrylate copolymer.

It has been discovered that copolymers of polyalkyl methacrylate and n-vinyl pyrrolidone (also known as n-vinyl-2-pyrrolidone or 1-vinyl-2-pyrrolidinone) are simultaneously useful for filtration control and rheological modification in oil-based drilling fluids, particularly invert emulsions, and more particularly ester and other synthetic-based fluids. It is known that the n-vinyl pyrrolidone proportion is smaller than the methacrylate proportion in these copolymers. The amount of n-vinyl pyrrolidone is believed to be small. In one embodiment of the invention, the amount of n-vinyl pyrrolidone in the copolymer is 15 wt. % or less and in another embodiment is 4 wt. % or less. Suitable copolymers of polyalkyl methacrylate and n-vinyl pyrrolidone may be made according to U.S. Pat. No. 3,506,574, incorporated herein by reference. These polyalkyl methacrylate copolymers are capable of building a viscoelastic rheological structure, which serves to prevent or reduce barite sag and provide cutting transport in these systems. Also, these copolymers show favorable interaction with emulsifiers and organophilic clays, which serves to stabilize and maintain the droplet size of invert emulsions. Copolymers of n-vinyl pyrrolidone with methylmethacrylate are also anticipated to be of use in the compositions of this invention.

By polyalkyl methacrylate is meant the copolymer is predominately a polymer of methacrylic add substituted with at least two alkyl groups, where the alkyl groups are independently straight or branched $C_1$ to $C_{20}$, preferably from about $C_1$ to $C_6$, and most preferably from about $C_1$ to $C_4$. Specific polyalkyl methacrylates suitable for use in this invention include, but are not necessarily limited to methylmethacrylate, ethylmethacrylate, propylmethacrylate and the like.

In accordance with this invention, ester and other synthetic based muds (as well as conventional oil-based muds) are provided with excellent thermal stability and fluid loss control at temperatures exceeding 300° F. by providing an additive to the drilling mud which comprises a copolymer of polyalkyl methacrylate and n-vinyl pyrrolidone having a weight average molecular weight between about 200,000 and 450,000 grams/mole.

In a preferred embodiment of the invention, a drilling fluid having good gel strength and suspension characteristics for carrying solid particles, such as bridging agents, weighting agents, cuttings, is made using an oil-based fluid, invert emulsion or synthetic base fluid; a polyalkyl methacrylate copolymer as a viscosifying agent, and an orgariophilic clay which acts as a suspending agent and additional viscosifier, all in a effective amounts to accomplish their stated purposes. In one embodiment of the invention, the polyalkyl methacrylate copolymer is present in the total oil-based drilling fluid in a proportion ranging from about 0.5 to about 10 lb/bbl; and preferably from 1 to about 4 lb/bbl; all based on the base fluid.

The base fluid may be any oil, conventional, such as diesel, or fluid yet to be developed which serves as a suitable media for the various components. "Oil" within the context of this invention is to be understood to include, but is not necessarily limited to, diesel oil and mineral oil. Invert emulsions may also be employed, which may contain an emulsifier and an aqueous phase, which may be brine. The base fluid may be a synthetic-based fluid, including, but not necessarily limited to, an ester-based or alpha-olefin-based fluid.

The oil used in these oil-based fluids may come from a variety of sources. ISO-TEQ® sold by Baker Hughes INTEQ, which is based on isomerized olefins, may be used. This is primarily because this oil is an environmentally acceptable oil with very low toxicity. The use of the term "olefins" with respect to the base fluid herein includes alpha-olefins, isomerized olefins, and other olefins and mixtures thereof suitable to be or serve as an oil-based fluid system. However, mineral oils such as Exxon's Escaid™ 110 or Conoco's LVT™ oils, or even diesel oil can be used in preparing the fluid systems of this invention.

Suspending or weighting agents are considered necessary for the invention, and may be any suitable material which adds weight to the drilling fluid which are conventional or yet to be developed. Specific non-limiting examples of suitable weighting agents include, but are not necessarily limited to, barite, hematite, manganese oxides, and the like. MILBAR™ is a barite weighting agent marketed by Baker Hughes INTEQ which is suitable for use with this invention.

Of course, other viscosifiers may be used to increase the viscosity of the system as well, either conventional ones or ones yet to be developed. Suitable viscosifiers may include, but are not necessarily limited to organophilic clays such as, amine-treated bentonite, hectorite or attapulgite. Specific examples of suitable viscosifiers include, but are not limited to CARBO-GEL™, a hectorite-based viscosifier; and CARBO-VIS™, a bentonite-based viscosifier, marketed by Baker Hughes INTEQ. Latex-based viscosifiers such as ALCOMER™ 274 or DOVERMUL™ made by Doverstrand may also be used to supplement the organophilic clays.

Calcium chloride may be added to provide salinity to control osmotic gradients. Other salts may be used instead of or in addition to calcium chloride.

One concern with drilling fluids is their stability, that is, the ability of the fluid to keep the weighting agents suspended over time and at elevated temperatures. This is discussed elsewhere as "barite sag"-that is, the tendency for barite to "fall out" of suspension. It is a goal of the invention to reduce or prevent barite sag. In one embodiment of the invention, the density of the drilling fluid is from about 8 to 18 lb/gal, preferably from about 12 to 16 lb/gal. The industry trend is toward increased density drilling fluids; thus, reducing or preventing sag is an increasingly important issue.

In the case where the oil phase encompasses an emulsion of water-in-oil, an emulsifier or mixture of emulsifiers in effective amounts that adequately accomplish the job are necessary. In some cases, it may be useful to employ a primary emulsifier and a secondary emulsifier, where the secondary emulsifier is used to enhance the properties of the primary emulsifiers. Some emulsifiers useful as secondary emulsifiers may also be effective as primary emulsifiers, and with many emulsifiers a secondary emulsifier may not be necessary. Suitable emulsifiers which may be used alone or together include but are not necessarily limited to oxidized tall oils and condensed amides, and the like. Specific examples of suitable emulsifiers include, but are not limited to OMNI-TEC, OMNI-MUL, CARBO-TEC, and CARBO-MUL HT, all marketed by Baker Hughes INTEQ. Oxidized tall oil fatty acid emulsifiers must be activated by lime (calcium hydroxide).

A filtration control agent is an additive to the oil- or synthetic-based fluid system that provides positive leak-off control after bridging has occurred. Conventional filtration control agents may be used in addition to the novel methacrylate copolymer herein, and may include, but are not necessarily limited to, oxidized asphalts, gilsonite or amine-treated lignite. Specific examples of suitable filtration control agents include, but are not limited to CARBO-TROL™, CARBOTROL HT™, or CARBO-TROL A-9, all marketed by Baker Hughes INTEQ.

Various other additives and agents may also be employed in the oil-based fluid systems of this invention if necessary or desired. For example, surfactants may be employed to assist in oil wetting and suspension of a particular particulate salt in the oil. Suitable surfactants may include, but are not necessarily limited to dodecyl amine sulfonate. Specific examples of suitable surfactants include, but are not limited to OMNI-COTE, a surfactant blend, marketed by Baker Hughes INTEQ. Other types of additives which may be suitable include, but are not necessarily limited to, corrosion inhibitors, scale inhibitors, and other common additives.

The drilling fluid of this invention may include other conventional components, such as proppants, solid particles or gravels, namely any solid particulate matter suitable for its intended purpose, for example as a screen or proppant, etc. Suitable materials include, but are not necessarily limited to sand, sintered bauxite, sized calcium carbonate, sized salts, ceramic beads, and the like, and combinations thereof.

It will be appreciated that the drilling fluids of this invention may contain additional conventional components in conventional proportions, including, but not necessarily limited to bridging agents, weighting agents, conventional filtration control agents, and the like.

The compositions and methods of this invention are quickly and easily and completely mixed using conventional equipment The invention will now be further illustrated by the following non-limiting Examples. Test data has demonstrated that effective filtration control and rheological properties can be achieved at relatively low concentrations of methacrylate copolymer.

TABLE 1

Synthetic Drilling Fluids Containing Polyalkyl Methacrylate Copolymer Rheological Modifier/Fluid Loss Control Agent
One Laboratory Barrel = 350 mL

| | Composition | | | |
|---|---|---|---|---|
| | Ex. 1 | Ex. 2 | Ex. 3 | Ex. 4 |
| | | | Polymer | |
| | VISCO-PLEX 6-954 | VISCO-PLEX 6-956 | VISCOPLEX 6-985 | VISCOPLEX 8-301 |
| Active Polymer Amount, g | 3[1] | 3[2] | 3[2] | 3[3] |
| Synthetic Ester, g | 194.4 | 196.5 | 196.5 | 198.4 |
| CARBO-GEL, g | 3 | 3 | 3 | 3 |
| OMNI-MUL, g | 10 | 10 | 10 | 10 |
| 25% CaCl$_2$, g | 53 | 53 | 53 | 53 |
| MIL-BAR, g | 255 | 255 | 255 | 255 |
| Ester/water ratio | 85/15 | 85/15 | 85/15 | 85/15 |
| Properties at 120° F. (After Hot-rolling 16 hours at 300° F.): | | | | |
| 600 rpm rdg | 111 | 91 | 98 | 60 |
| 300 rpm rdg | 70 | 58 | 60 | 36 |
| 200 rpm rdg | 56 | 46 | 47 | 29 |
| 100 rpm rdg | 38 | 33 | 32 | 21 |
| 6 rpm rdg | 14 | 13 | 12 | 10 |
| 3 rpm rdg | 12 | 12 | 10 | 9 |
| Plastic Viscosity, cP | 41 | 33 | 38 | 24 |
| Yield Point, lb$_f$/100 ft$^2$ | 29 | 25 | 12 | 12 |
| 10-second Gel, lb$_f$/100 ft$^2$ | 13 | 12 | 11 | 9 |
| 10-minute Gel, lb$_f$/100 ft$^2$ | 19 | 16 | 16 | 11 |
| Electrical Stability, Volts | 1557 | 1543 | 1239 | 1611 |
| Density (lbm/gal) | 12.5 | 12.5 | 12.5 | 12.5 |
| HPHT, mL/30 min. @ 300° F. | 3.8 | 4.2 | 4.4 | 10.6 |

[1]Polymer consists of 35% Active Material, total weight of VISCOPLEX 6-954 added was 8.57 g
[2]Polymer consists of 46% Active Material, total weight of VISCOPLEX 6-985 and VISCOPLEX 6-985 added was 6.52 g
[3]Polymer consists of 65% Active Material, total weight of VISCOPLEX 8-301 added was 4.61 g The data for Example 1, Table 1, employing a polyalkyl methacrylate copolymer of 450,000 molecular weight of this invention, show very good results, particularly for High Pressure, High Temperature filtration, as compared with those of Example 4, Table 1, which used a polyalkyl methacrylate copolymer of 100,000 molecular weight, outside the preferred range herein.

The drilling fluid of Example 5 using an invert emulsion of oil/water in a ratio of 85/15, respectively, was prepared and evaluated similarly to the drilling fluids Examples 1; the results are given in Table II.

TABLE II

Synthetic Drilling Fluids Containing Polyalkyl Methacrylate Copolymer Rheological Modifier/Fluid Loss Control Agent
(One Laboratory Barrel = 350 mL)

| Composition | Ex 5 |
|---|---|
| Ester, g | 189.6 |
| Active VISCOPLEX 6-954, g | 4[1] (Active) |
| CARBO-GEL, g | 4 |
| OMNI-MUL, g | 10 |
| 25% CaCl$_2$, g | 53 |
| MILBAR, g | 257 |

[1]VISCOPLEX 6-954 consists of 35/% active polymer.

| | Initial - immediately after mixing, 120° F. | After Aging | |
|---|---|---|---|
| Fann 35 Properties | | 120° F. | 180° F. |
| 600 rpm rdg | 120 | 128 | 70 |
| 300 rpm rdg | 72 | 74 | 39 |
| 200 rpm rdg | 54 | 54 | 30 |
| 100 rpm rdg | 33 | 33 | 19 |
| 6 rpm rdg | 9 | 8 | 6 |
| 3 rpm rdg | 8 | 7 | 5 |
| Plastic Viscosity, cP | 48 | 54 | 31 |
| Yield Point, lb$_f$/100 ft$^2$ | 24 | 20 | 8 |
| 10-sec Gel, lb$_f$/100 ft$^2$ | 8 | 8 | 7 |
| 10-min Gel, lb$_f$/100 ft$^2$ | 12 | 10 | 9 |
| Electrical Stability, Volts | 1249 | 1574 | |
| HPHT Filtration, mL/30 min at 250° F. | | 1.8 | |

Aging was conducted by hot rolling at 250° F. for 16 hours.

A sag test was conducted after hot rolling for 48 hours, and static aging at 250° F. The change in specific gravity between the top and bottom of a conventional cell, $\Delta SG$= 0.21. Only 7 mL of free oil in 350 mL of the drilling fluid could be withdrawn from the top of the cell. Both of these results indicate excellent stability for the composition of this invention.

Examples 6,7 and 8 of Tables III and IV demonstrate that compositions using copolymers of various molecular weights do not adversely affect the droplet size properties of a synthetic ester drilling fluid.

Figure 2:
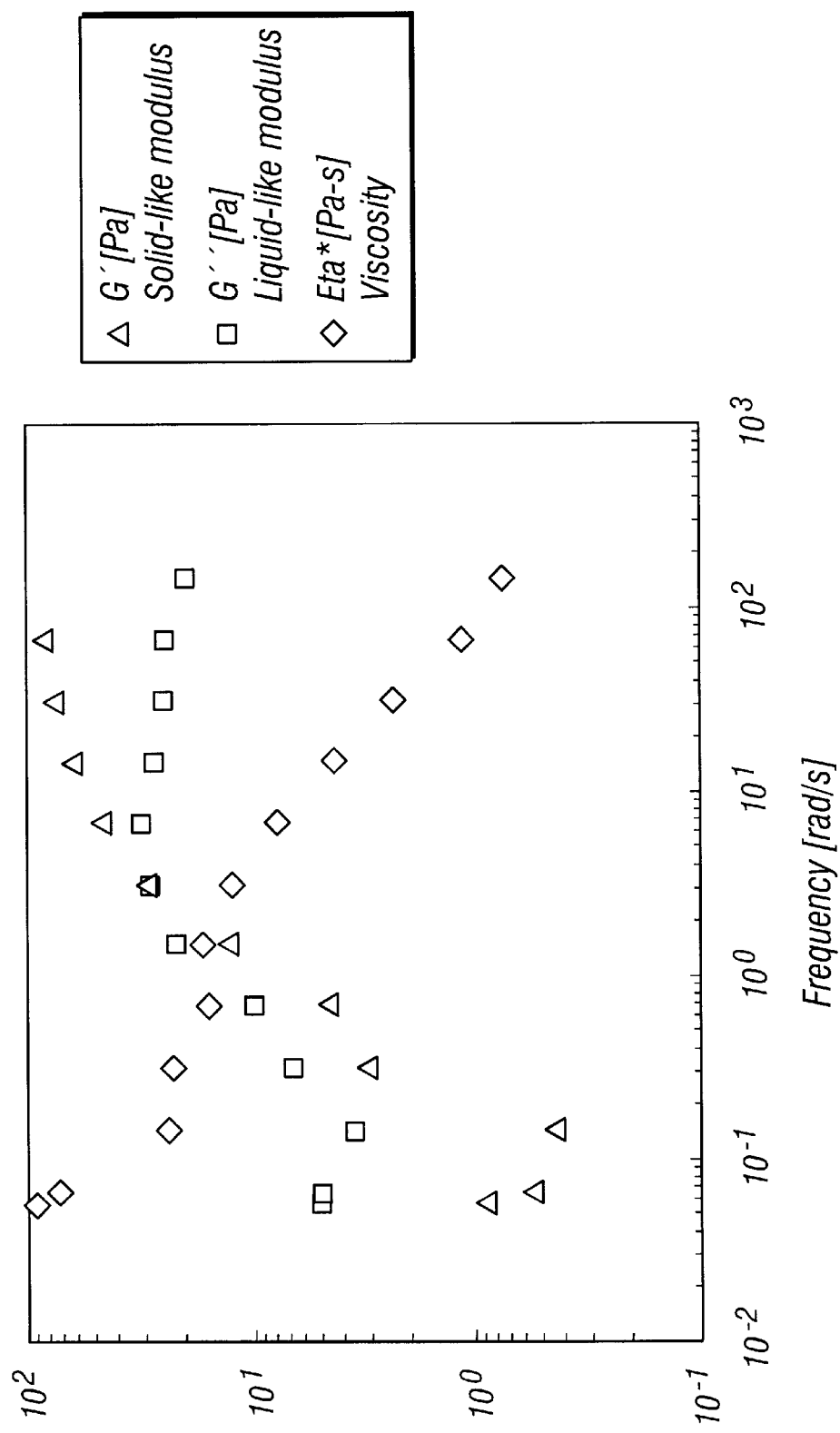
FIG. 2 graphs the dynamic frequency sweep of a composition identical to that used in FIG. 1 except that no polyalkyl methacrylate copolymer was included.

FIG. 1 shows the viscoelastic properties of the rheological measurements of drilling mud with polyalkyl methacrylate copolymer, as formulated in Example 5, Table 2. FIG. 2 shows the viscoelastic properties of the rheological measurements of an identical drilling mud but without polyalkyl methacrylate copolymer. In FIG. 1, the elastic modulus of the fluid, G', predominates over the viscous modulus, G". In addition, the G' curve in FIG. 1 is relatively flat and independent of frequency compared to the G' curve in FIG. 2. The rheological behavior shown in FIG. 1 indicates that the fluid is more gel-like and structure. These properties are necessary to prevent barite sag and provide cutting transport in these drilling systems.

TABLE III

Synthetic Drilling Fluids Containing Polyalkyl Methacrylate Copolymer As A Rheological Modifier/Fluid Loss Control Agent (One laboratory barrel = 350 mL)

| | Ex. 6 | Ex. 7 | Ex. 8 |
|---|---|---|---|
| | | Polymer | |
| | VISCOPLEX 6-954 | VISCOPLEX 6-956 | No polymer |
| Active Polymer, g | 2[1] | 2[2] | 0 |
| Synthetic ester, g | 196.3 | 197.5 | 200 |
| CARBO-GEL, g | 4 | 4 | 4 |
| OMNIMUL, g | 10 | 10 | 10 |
| 25% $CaCl_2$, g | 53 | 53 | 53 |
| MIL-BAR, g | 253 | 253 | 253 |
| Properties at 120° F. (After dynamically aging 16 hours at 300° F.): | | | |
| Plastic Viscosity, cP | 30 | 28 | 21 |
| Yield Point, $lb_f/100\ ft^2$ | 30 | 25 | 27 |
| 6 rpm rdg | 16 | 13 | 16 |
| 3 rpm rdg | 15 | 12 | 15 |
| 10-second Gel, $lb_f/100\ ft^2$ | 16 | 13 | 13 |
| 10-minute Gel, $lb_f/100\ ft^2$ | 21 | 14 | 16 |
| Electrical Stability, Volts | 1819 | 1531 | 1461 |
| ΔSG, g/mL | 0.07 | 0.20 | 0.65 |

[1]Polymer consists of 35% Active material, total weight of VISCOPLEX 6-954 added was 5.71 g.
[2]Polymer consists of 46% Active material, total weight of VISCOPLEX 6-956 added was 4.35 g.

TABLE IV

Effects of Polymers on Particle Size of the Invert Emulsion Drilling Fluid (All measurements in microns, by laser light scattering)

| Ex. | | Mean volume droplet size D (4.3) | Mean surface area D(3,2) | Median Droplet Size D(V,0.5) |
|---|---|---|---|---|
| 6 | Initial | 1.46 | 0.85 | 1.10 |
| | After HR at 300° F. | 0.98 | 0.77 | 0.82 |
| 7 | Initial | 1.96 | 1.06 | 1.61 |
| | After HR at 300° F. | 1.15 | 0.8 | 0.83 |
| 8 | Initial | 2.10 | 1.88 | 13.0 |
| | After HR at 300° F. | 7.86 | 3.65 | 21.55 |

The formulations of the Examples 6 and 7 in Table IV gave good results after hot rolling at 300° F.; the mean drop sizes were sill very low, as compared with those of Example 8, Table IV, which did not contain polyalkyl methacrylate copolymer. Thus, the systems of this invention stabilize and help maintain the droplet size of the invert emulsions.

In the foregoing specification, the invention has been described with reference to specific embodiments thereof, and has been demonstrated as effective in providing drilling fluids with improved rheological properties and filtration control. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of base fluids and polyalkyl methacrylate copolymers falling within the claimed parameters, but not specifically identified or tried in a particular composition to improve the properties of the base fluids herein, are anticipated to be within the scope of this invention.

GLOSSARY

| | |
|---|---|
| CARBO-GEL ™ | An amine treated hectorite clay marketed by Baker Hughes INTEQ. |
| ISO-TEQ ® | A non-toxic, biodegradable olefin isomer fluid marketed by Baker Hughes INTEQ. |
| MILBAR ™ | Barite weighting agent marketed by Baker Hughes INTEQ. |
| OMNI-MUL ™ | An emulsifier marketed by Baker Hughes INTEQ. |
| VISCOPLEX 6-954 | A 450,000 gram/mole weight average molecular weight polyalkyl methacrylate copolymer available from ROHMAX. |
| VISCOPLEX 6-956 | A 200,000 gram/mole weight average molecular weight polyalkyl methacrylate copolymer available from ROHMAX. |
| VISCOPLEX 6-985 | A 300,000 gram/mole weight average molecular weight polyalkyl methacrylate copolymer available from ROHMAX. |
| VISCOPLEX 8-301 | A 100,000 gram/mole weight average molecular weight polyalkyl methacrylate copolymer available from ROHMAX. |

We claim:

1. An oil-based fluid system for use in oil and gas well drilling operations comprising:

a polyalkyl methacrylate with vinyl pyrrolidone copolymer;

a weighting agent; and a base fluid selected from the group consisting of:
   oil,
   invert emulsion base fluids containing an emulsifier and brine,
   esters,
   olefins, and
   paraffins.

2. The oil-based fluid system of claim 1 where the proportion of the copolymer in the base fluid ranges from about 0.5 to 10 lb/bbl.

3. The oil-based fluid system of claim 1 where the copolymer has a weight average molecular weight from about 200,000 to about 450,000 g/mole.

4. The oil-based fluid system of claim 1 where alkyl groups on the polyalkyl methacrylate portion of the copolymer range from $C_1$ to $C_{20}$.

5. The oil-based fluid system of claim 1 where in the copolymer, the amount of vinyl pyrrolidone is 15 wt. % or less.

6. The oil-based fluid system of claim 1 further comprising an organophilic clay.

7. The oil-based fluid system of claim 1 further comprising an additional filtration control agent.

8. An oil-based fluid system for use in oil and gas drilling operations comprising:

about 0.5 to 10 lb active material/bbl of a polyalkyl methacrylate with vinyl pyrrolidone copolymer having a weight average molecular weight from about 200,000 to about 450,000 g/mole;

a weighting agent; and a base fluid making up the balance, where the base fluid is selected from the group consisting of:
   oil,
   invert emulsion base fluids containing an emulsifier and brine, esters,
olefins, and
paraffins;
where the proportion of the copolymer is based on the base fluid.

9. A method of placing a fluid system in a well comprising:
providing an oil-based fluid system comprising:
a base fluid selected from the group consisting of:
oil,
invert emulsion base fluids containing an emulsifier and brine,
esters,
olefins, and
paraffins, and
a weighting agent;
mixing into the fluid system a polyalkyl methacrylate with vinyl pyrrolidone copolymer; and
circulating the fluid system within a bore hole in an underground formation.

10. The method of claim 9 where the proportion of the copolymer mixed into the fluid system ranges from about 0.5 to 10 lb active material/bbl, based on the base fluid.

11. The method of claim 10 where the copolymer has a weight average molecular weight from about 200,000 to about 450,000 g/mole.

12. The method of claim 9 where in mixing the copolymer, the alkyl groups on the polyalkyl methacrylate portion of the copolymer range from $C_1$ to $C_{20}$.

13. The method of claim 9 where in mixing the copolymer, the amount of vinyl pyrrolidone in the copolymer is 15 wt. % or less.

14. The method of claim 9 further providing an organophilic clay in the fluid system.

15. The method of claim 9 further comprising an additional filtration control agent in the fluid system.

16. A method of drilling a well comprising:
providing an oil-based fluid system comprising:
a base fluid selected from the group consisting of:
oil,
invert emulsion base fluids containing an emulsifier and brine,
esters,
olefins, and
paraffins, and
a weighting agent;
mixing into the fluid system a polyalkyl methacrylate with vinyl pyrrolidone copolymer; and
circulating the fluid system while drilling the well within a bore hole in contact with a drill bit and an underground formation.

17. The method of claim 16 where the proportion of the copolymer mixed into the fluid system ranges from about 0.5 to 10 lb active material/bbl, based on the base fluid.

18. The method of claim 17 where the copolymer has a weight average molecular weight from about 200,000 to about 450,000 g/mole.

19. A method of treating a well with a spotting fluid system comprising:
providing an oil-based fluid system comprising:
a base fluid selected from the group consisting of:
oil,
invert emulsion base fluids containing an emulsifier and brine,
esters,
olefins, and
paraffins, and
a weighting agent;
mixing into the fluid system a polyalkyl methacrylate with vinyl pyrrolidone copolymer; and
circulating the resulting fluid spotting fluid system within a bore hole in contact with drill pipe and an underground formation.

20. The method of claim 19 where the proportion of the copolymer mixed into the fluid system ranges from about 0.5 to 10 lb active material/bbl, based on the base fluid.

21. The method of claim 20 where the copolymer has a weight average molecular weight from about 200,000 to about 450,000 g/mole.

* * * * *

UNITED STATES PATENT AND TRADEMARK OFFICE
CERTIFICATE OF CORRECTION

PATENT NO. : 6,204,224 B1
DATED : March 20, 2001
INVENTOR(S) : Lirio Quintero; Shannon Stocks-Fischer; William R. Bradford, Jr.; Dennis K. Clapper It is certified that error appears in the above-identified patent and that said Letters Patent is hereby corrected as shown below:

Abstract,
Line 8, please add a comma after the word "esters."

Column 3,
Line 15, please delete the word "add" and replace with -- acid --.
Line 37, please delete the word "orgariophilic" and replace with -- organophilic --.

Column 7,
Line 51, please delete the word "sill" and replace with -- still --.

Signed and Sealed this

Sixth Day of November, 2001

*Attest:*

NICHOLAS P. GODICI
*Attesting Officer*     *Acting Director of the United States Patent and Trademark Office*